US012682080B2

(12) United States Patent
Finnbogason et al.

(10) Patent No.: US 12,682,080 B2
(45) Date of Patent: Jul. 14, 2026

(54) MACHINE LEARNING TECHNIQUES FOR GENERATING COMMON VULNERABILITY SCORING SYSTEM VECTORS

(71) Applicant: Rapid7, Inc., Boston, MA (US)

(72) Inventors: Gudlaugur Finnbogason, Belfast (GB); Stuart Millar, Bangor (GB)

(73) Assignee: Rapid7, Inc., Boston, MA (US)

( * ) Notice: Subject to any disclaimer, the term of this patent is extended or adjusted under 35 U.S.C. 154(b) by 135 days.

(21) Appl. No.: 18/931,600

(22) Filed: Oct. 30, 2024

(65) Prior Publication Data

US 2026/0119675 A1 Apr. 30, 2026

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

| | | | | |
|---|---|---|---|---|
| 2019/0102564 A1* | 4/2019 | Li | ............................ | G06F 21/57 |
| 2020/0012796 A1* | 1/2020 | Trepagnier | ............ | G06F 18/254 |
| 2020/0210590 A1* | 7/2020 | Doyle | .................... | G06F 21/577 |
| 2021/0152588 A1* | 5/2021 | Cruz | ........................ | G06F 8/658 |
| 2021/0312058 A1* | 10/2021 | Chiarelli | .............. | G06Q 10/067 |
| 2022/0141247 A1* | 5/2022 | Shakarian | ........... | H04L 63/1433 |
| | | | | 726/25 |
| 2022/0286475 A1* | 9/2022 | Mullaney | ............... | G06N 20/00 |
| 2022/0394055 A1* | 12/2022 | Mukkamala | ........ | H04L 63/1433 |
| 2023/0038196 A1* | 2/2023 | Labreche | .............. | G06F 21/577 |
| 2025/0036777 A1* | 1/2025 | Cameron | .............. | G06F 21/577 |
| 2025/0165618 A1* | 5/2025 | Cameron | .............. | G06F 21/552 |

(Continued)

FOREIGN PATENT DOCUMENTS

| | | | | |
|---|---|---|---|---|
| CN | 101620653 A | * | 1/2010 | |
| CN | 117769706 A | * | 3/2024 | ......... H04L 63/1408 |

(Continued)

OTHER PUBLICATIONS

S. Kai, J. Zheng, F. Shi and Z. Lu, "A CVSS-based Vulnerability Assessment Method for Reducing Scoring Error," 2021 2nd International Conference on Electronics, Communications and Information Technology (CECIT), Sanya, China, 2021, pp. 25-32, (Year: 2021).*

(Continued)

*Primary Examiner* — Sher A Khan
(74) *Attorney, Agent, or Firm* — Wolf, Greenfield & Sacks, P.C.

(57) ABSTRACT

Some embodiments provide techniques for generating common vulnerability scoring system (CVSS) vectors for vulnerabilities to use in scanning a computing environment for vulnerabilities. The techniques involve obtaining a textual description of a vulnerability; generating inputs for a plurality of ML models using the textual description of the vulnerability; providing the inputs to the plurality of ML models to obtain outputs indicating values of CVSS risk metrics; and storing the values of the CVSS risk metrics indicated by the outputs of the plurality of ML models in a vector to obtain the CVSS vector for the vulnerability.

16 Claims, 7 Drawing Sheets

(56) References Cited

U.S. PATENT DOCUMENTS

| | | | | |
|---|---|---|---|---|
| 2025/0291898 A1* | 9/2025 | Bu | .......................... | G06F 21/55 |
| 2025/0291932 A1* | 9/2025 | Bu | ........................ | G06F 21/577 |

FOREIGN PATENT DOCUMENTS

| | | | | | |
|---|---|---|---|---|---|
| WO | WO-2019089389 A1 * | 5/2019 | ........... | G06F 21/577 |
| WO | WO-2022023671 A1 * | 2/2022 | ........... | G06F 21/577 |
| WO | WO-2023219614 A1 * | 11/2023 | ........... | G06F 21/577 |

OTHER PUBLICATIONS

[No Author Listed] Vulnerability Metrics. National Vulnerability Database. Sep. 20, 2022. https://nyd.nist.gov/vuln-metrics/cvss. [last accessed Feb. 20, 2025] 2 pages.

[No Author Listed] Common Vulnerability Scoring System Calculator. CVSS Version 3.0. National Vulnerability Database. https://nyd.nist.gov/vuln-metrics/cvss/v3-calculator. [last accessed Feb. 20, 2025] 2 pages.

[No Author Listed] Common Vulnerability Scoring System Calculator. CVSS Version 4.0. National Vulnerability Database. https://nyd.nist.gov/vuln-metrics/cvss/v4-calculator. [last accessed Feb. 20, 2025] 2 pages.

[No Author Listed] Common Vulnerability Scoring System SIG. https://www.first.org/cvss/. [last accessed Feb. 20, 2025] 1 page.

[No Author Listed] Common Vulnerability Scoring System version 3.1: Specification Document. First. https://www.first.org/cvss/v3.1/specification-document. [last accessed Feb. 20, 2025] 24 pages.

[No Author Listed] Common Vulnerability Scoring System version 4.0: Specification Document. First. https://www.first.org/cvss/v4.0/specification-document. [last accessed Feb. 20, 2025] 40 pages.

[No Author Listed] Get started. What is fastText? Facebook Open Source. https://fasttext.cc/docs/en/support.html. [last accessed Feb. 20, 2025] 2 pages.

[No Author Listed] PyTorch documentation. PyTorch https://pytorch.org/docs/stable/index.html#. [last accessed Feb. 20, 2025] 4 pages.

[No Author Listed] The Claude 3 Model Family: Opus, Sonnet, Haiku. https://assets.anthropic.com/m/61e7d27f8e8f5919/original/Claude-3-Model-Card.pdf. [last accessed Feb. 20, 2025] 64 pages.

* cited by examiner

MACHINE LEARNING TECHNIQUES FOR GENERATING COMMON VULNERABILITY SCORING SYSTEM VECTORS

BACKGROUND

The common vulnerability scoring system (CVSS) is a standard framework for indicating characteristics and severity of software vulnerabilities. In the CVSS framework, values of risk metrics are indicated by a CVSS vector. For example, the CVSS vector may be a vector composed of string values of the risk metrics. CVSS allows the comparison of vulnerabilities across different applications and systems in a standardized way. CVSS also provides a scoring system that generates, based on the values of the risk metrics, a score between 0 and 10 indicating the severity of a vulnerability.

CVSS was originally commissioned by the National Infrastructure Advisory Council (NIAC) to provide a global vulnerability assessment framework. The CVSS specifications are currently managed by FIRST.Org, Inc. (FIRST), which is a U.S.-based non-profit organization, whose mission is to help computer security incident response teams. There are different versions of the CVSS standard that have been published including CVSS v1, CVSS v2, CVSS v3.0, CVSS v3.1, and CVSS v4.0. Documentation for each of the versions is published by FIRST. FIRST also provides risk score calculators for different versions of the CVSS standard on its website.

SUMMARY

Some embodiments provide a method for generating common vulnerability scoring system (CVSS) vectors of vulnerabilities for use by a vulnerability scanning system in scanning a computing environment for the vulnerabilities, each particular one of the CVSS vectors comprising values of a plurality of risk metrics determined for a vulnerability associated with the particular CVSS vector. The method comprises using at least one computer hardware processor to perform: generating, using a plurality of trained machine learning (ML) models corresponding to the plurality of risk metrics, a CVSS vector for each particular vulnerability in a set of one or more vulnerabilities to obtain one or more CVSS vectors, the generating comprising: obtaining a textual description of the particular vulnerability; generating a CVSS vector for the particular vulnerability using the textual description of the particular vulnerability and the plurality of trained ML models corresponding to the plurality of risk metrics, each of the plurality of trained ML models having been trained to produce an output indicating a value of a respective one of the plurality of risk metrics for the particular vulnerability, the generating comprising: generating inputs for each of the plurality of ML models using the textual description of the particular vulnerability; providing the inputs to the plurality of ML models to obtain outputs indicating values of the plurality of risk metrics for the particular vulnerability; and storing the values of the plurality of risk metrics indicated by the outputs of the plurality of ML models in a vector to obtain the CVSS vector for the particular vulnerability; and scanning, using the vulnerability scanning system, the computing environment for one or more vulnerabilities in the set of one or more vulnerabilities using the one or more CVSS vectors generated for the set of one or more vulnerabilities.

Some embodiments provide at least one non-transitory computer-readable storage medium storing instructions that, when executed by at least one computer hardware processor, cause the at least one computer hardware processor to perform a method for generating common vulnerability scoring system (CVSS) vectors for vulnerabilities to use by a vulnerability scanning system in scanning a computing environment for the vulnerabilities, each particular one of the CVSS vectors comprising values of a plurality of risk metrics that are used to determine a risk score for a vulnerability associated with the particular CVSS vector. The method comprises: generating, using a plurality of trained machine learning (ML) models corresponding to the plurality of risk metrics, a CVSS vector for each particular vulnerability in a set of one or more vulnerabilities to obtain one or more CVSS vectors, the generating comprising: obtaining a textual description of the particular vulnerability; generating a CVSS vector for the particular vulnerability using the textual description of the particular vulnerability and the plurality of trained ML models corresponding to the plurality of risk metrics, each of the plurality of trained ML models having been trained to produce an output indicating a value of a respective one of the plurality of risk metrics for the particular vulnerability, the generating comprising: generating inputs for each of the plurality of ML models using the textual description of the particular vulnerability; providing the inputs to the plurality of ML models to obtain outputs indicating values of the plurality of risk metrics for the particular vulnerability; and storing the values of the plurality of risk metrics indicated by the outputs of the plurality of ML models in a vector to obtain the CVSS vector for the particular vulnerability; and scanning, using the vulnerability scanning system, the computing environment for one or more vulnerabilities in the set of one or more vulnerabilities using the one or more CVSS vectors generated for the set of one or more vulnerabilities.

Some embodiments provide a system for generating common vulnerability scoring system (CVSS) vectors of vulnerabilities for use by a vulnerability scanning system in scanning a computing environment for the vulnerabilities, each particular one of the CVSS vectors comprising values of a plurality of risk metrics determined for a vulnerability associated with the particular CVSS vector. The system comprises: at least one computer hardware processor; and at least one non-transitory computer-readable storage medium storing instructions that, when executed by the at least one computer hardware processor, causes the at least one computer hardware processor to perform: generating, using a plurality of trained machine learning (ML) models corresponding to the plurality of risk metrics, a CVSS vector for each particular vulnerability in a set of one or more vulnerabilities to obtain one or more CVSS vectors, the generating comprising: obtaining a textual description of the particular vulnerability; generating a CVSS vector for the particular vulnerability using the textual description of the particular vulnerability and the plurality of trained ML models corresponding to the plurality of risk metrics, each of the plurality of trained ML models having been trained to produce an output indicating a value of a respective one of the plurality of risk metrics for the particular vulnerability, the generating comprising: generating inputs for each of the plurality of ML models using the textual description of the particular vulnerability; providing the inputs to the plurality of ML models to obtain outputs indicating values of the plurality of risk metrics for the particular vulnerability; and storing the values of the plurality of risk metrics indicated by the outputs of the plurality of ML models in a vector to obtain the CVSS vector for the particular vulnerability; and scanning, using the vulnerability scanning system, the computing environment for one or more vulnerabilities in the set of one or more vulnerabilities using the one or more CVSS vectors generated for the set of one or more vulnerabilities.

The foregoing summary is non-limiting.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1:
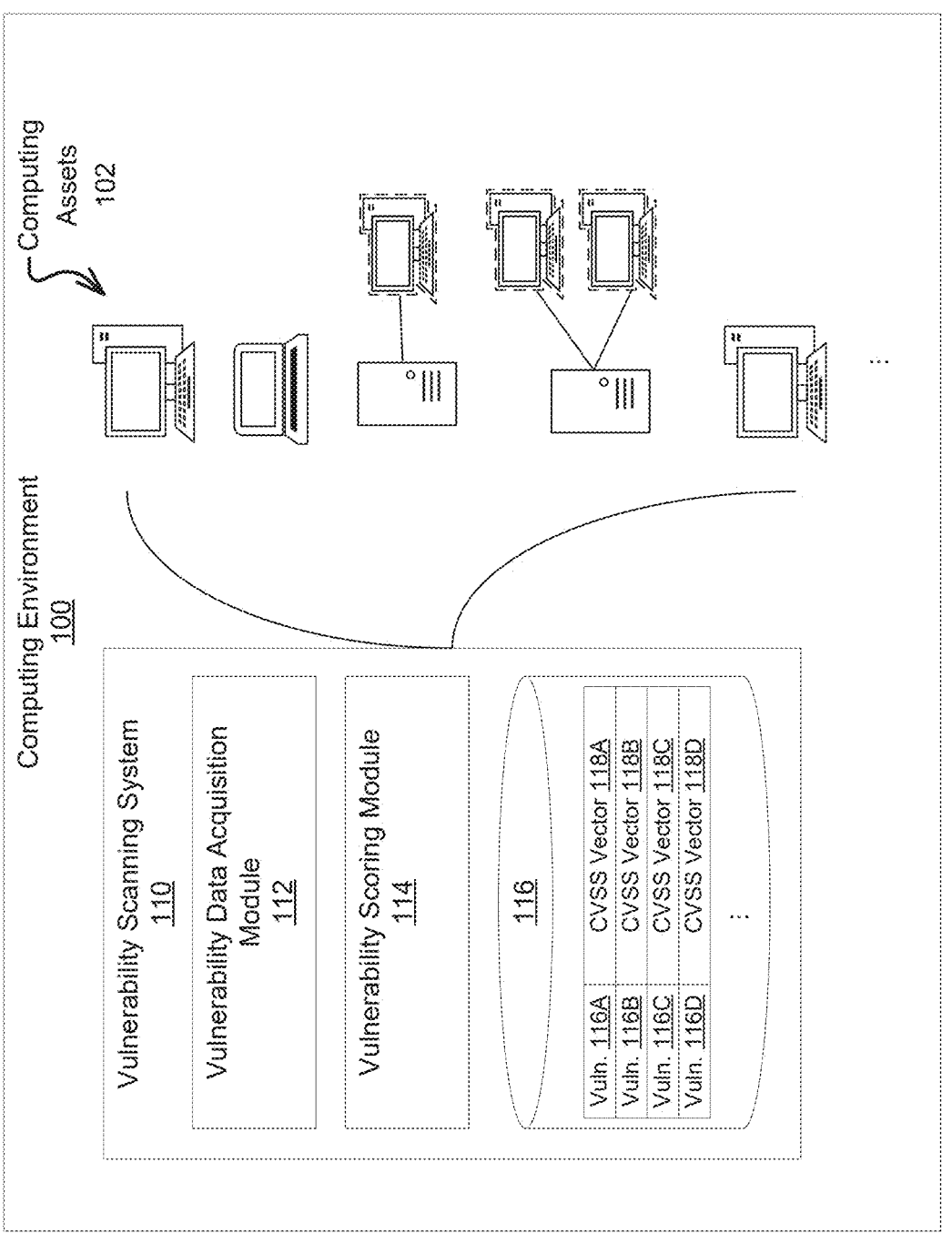
FIG. 1 shows an example computing environment in which some embodiments of the technology described herein may be implemented.

The inventors have developed techniques for generating CVSS vectors for vulnerabilities to use in performing vulnerability scanning. The generated CVSS vectors may be used to determine the level of risk associated with vulnerabilities detected in the computing environment (e.g., by determining one or more risk scores associated with the vulnerabilities). The level of risk associated with a detected vulnerability may be used to mitigate the risk associated with the detected vulnerability (e.g., by performing a remediation function based on the level of risk).

Vulnerability scanning systems often use CVSS vectors in scanning computing environments for vulnerabilities. A vulnerability scanning system may use a CVSS vector associated with a vulnerability to determine a risk score associated with the vulnerability. In turn, the risk score may be used by the vulnerability scanning system for mitigating the vulnerability (e.g., by selecting and implementing a remediation strategy based on the risk score). A vulnerability scanning system may include a CVSS vector associated with a vulnerability and/or a risk score determined using the CVSS vector as vulnerability metadata in vulnerability scanning results provided to a user (e.g., an administrator for the computing environment). The CVSS vectors and/or risk scores derived therefrom may be used to understand the level of risk associated with detected vulnerabilities and determine an approach to mitigate the risks (e.g., installing a patch, restricting access to data, limiting operation of a software application, restricting actions that can be performed by a user, and/or other actions). Risks associated with vulnerabilities can be mitigated by: (1) a user determining a mitigation strategy based on a presented CVSS vector and/or an associated score, or (2) a system automatically executing one or more remediation functions based on a CVSS vector and/or risk score.

One challenge for vulnerability scanning systems is that CVSS vectors are frequently not available for vulnerabilities. CVSS vectors are typically published by an independent body in a database (e.g., the National Vulnerability Database (NVD)) from which they can be obtained for use by vulnerability scanning systems. In some cases, the independent body may take time (e.g., weeks) to generate a CVSS vector for a vulnerability (e.g., a new vulnerability). In other cases, the independent body may never generate a CVSS vector for the vulnerability (e.g., due to time constraints, limited resources, etc.). Thus, a vulnerability scanning system may not have a CVSS vector to use in scanning a computing environment for each and every vulnerability, which makes the vulnerability scanning system unable to determine the level of risk associated with certain vulnerabilities. This degrades the ability of the vulnerability scanning system to correctly assess and address the vulnerabilities.

Conventional vulnerability scanning systems address the above-described challenge by using a default CVSS vector for vulnerabilities that do not have an associated CVSS vector (e.g., in the NVD database). This technique degrades the vulnerability scanning results provided by the vulnerability scanning system. Displaying a default CVSS vector which does not represent the actual risk of an associated vulnerability provides an inaccurate risk assessment for the computing environment. This in turn results in improper or even failed remediation of the risk. For example, the vulnerability may not be properly prioritized to address. As another example, a remediation action that does not sufficiently mitigate the threat posed by the vulnerability may be performed. As another example, no remediation action may be performed due to an inaccurate risk score determined for a vulnerability.

To address the above-described challenge, the inventors have developed machine learning-based techniques for automatically generating CVSS vectors for vulnerabilities using textual descriptions of the vulnerabilities. The techniques use multiple trained ML models to process the vulnerability descriptions and generate CVSS vectors. Each of the trained ML models is trained to produce an output indicating a value of a particular risk metric. The system generates inputs to the trained ML models using the vulnerability description and provides the inputs to the trained ML models to obtain predicted risk metric values. The system generates CVSS vectors using the predicted risk metric values.

The CVSS vector generation techniques developed by the inventors and described herein improve vulnerability scanning systems in various ways. Firstly, the techniques expand the universe of vulnerabilities for which the vulnerability scanning system can provide and use CVSS vectors (e.g., to determine a risk score). Some vulnerabilities that may never have CVSS vectors generated for them, while others may not currently have CVSS vectors available. The techniques can be used to instantly generate CVSS vectors for such vulnerabilities and then integrate the CVSS vectors into vulnerability scanning. A vulnerability scanning system may use the generated CVSS vectors to provide vulnerability metadata that it otherwise would not have been able to. The techniques further eliminate delays in obtaining CVSS vectors for vulnerabilities (e.g., new vulnerabilities). Instead of waiting for CVSS vectors to become available in a repository (e.g., the NVD), the techniques may be used to generate CVSS vectors on demand. This allows vulnerability scanning systems keep scanning capabilities up-to-date with the most recent vulnerabilities.

Figure 2A:
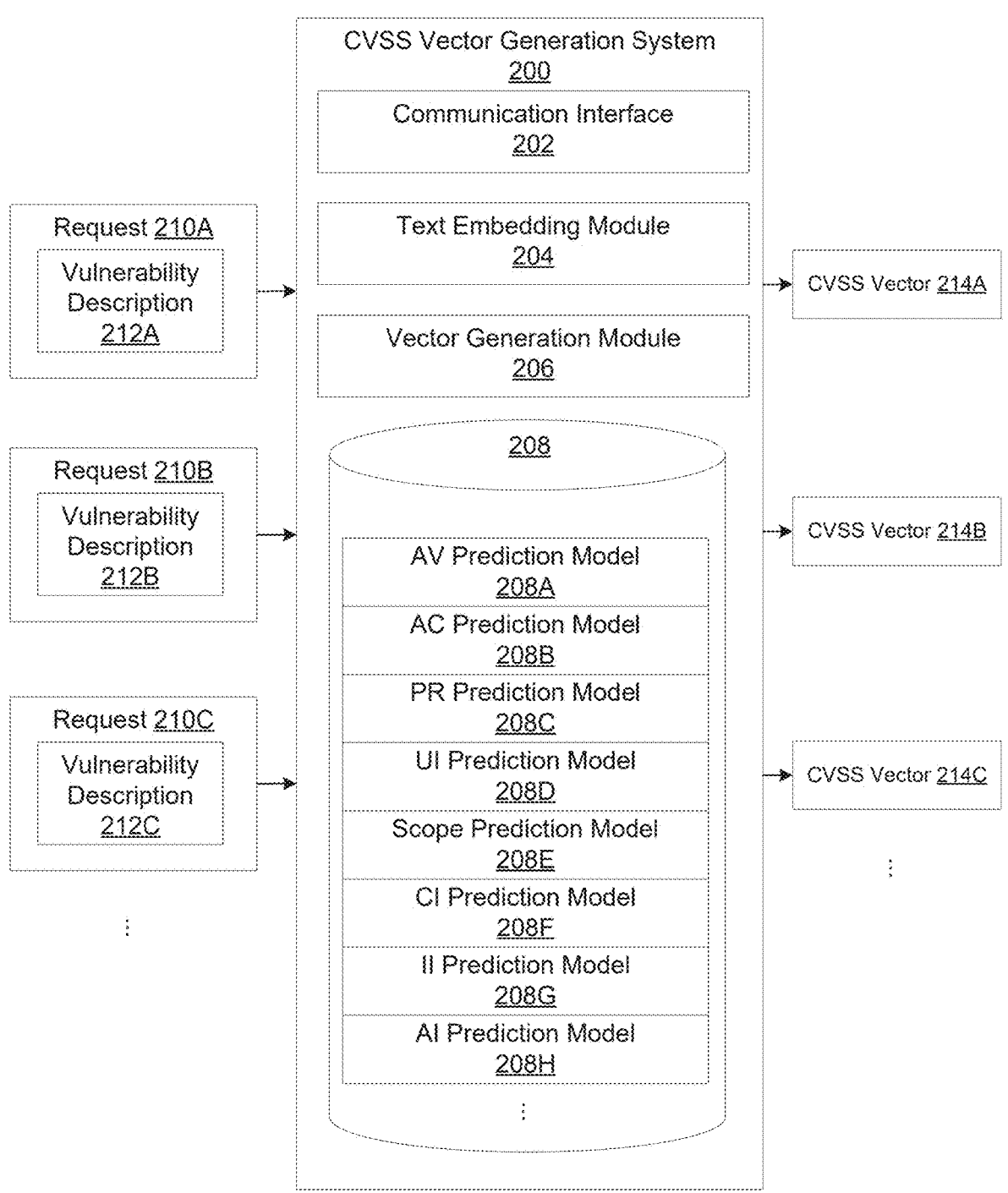
FIG. 2A shows an example of a CVSS vector generation system, according to some embodiments of the technology described herein.
Figure 2B:
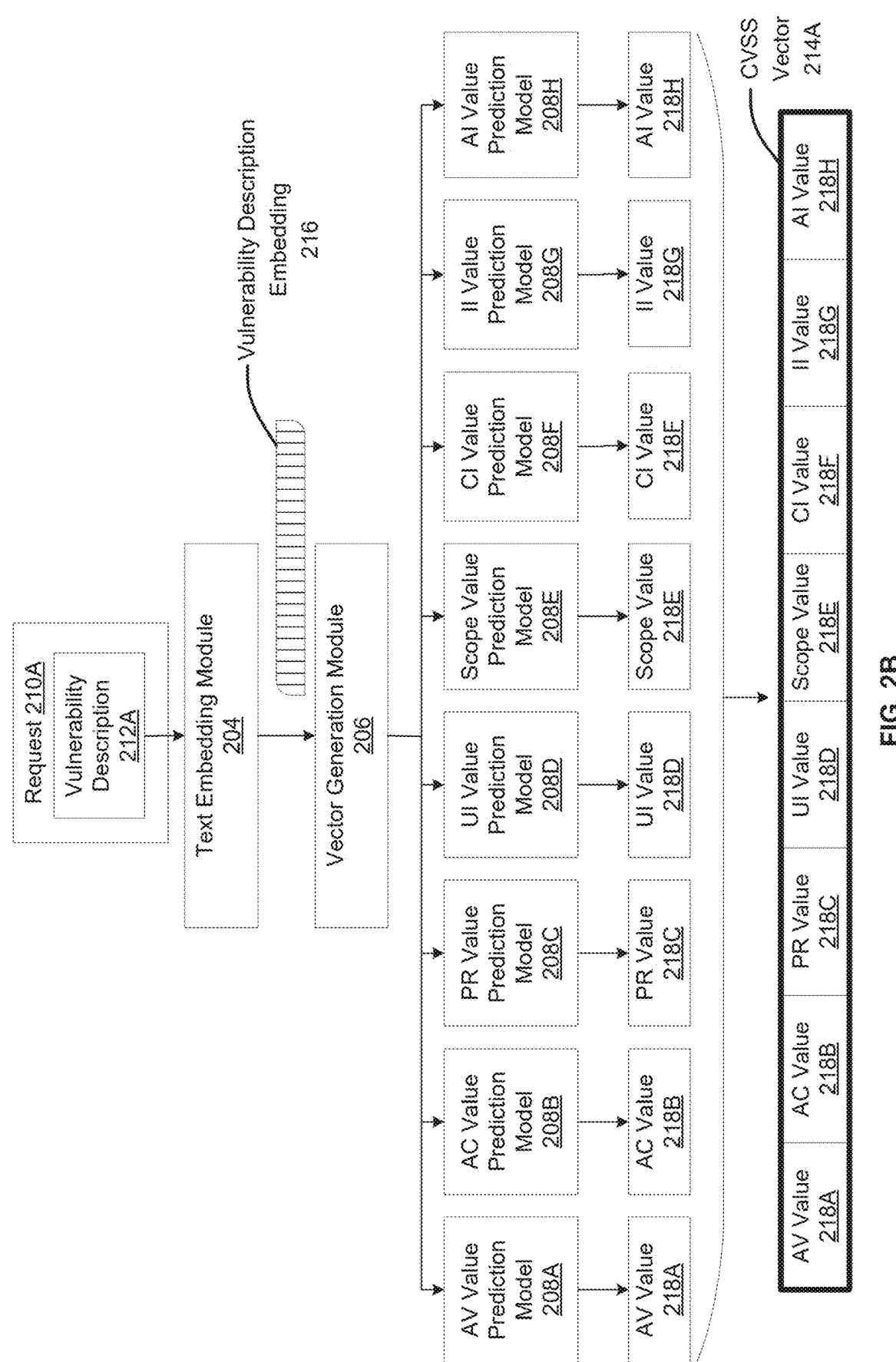
FIG. 2B illustrates generation of a CVSS vector by the CVSS vector generation system of FIG. 2A, according to some embodiments of the technology described herein.

Some embodiments provide a system for generating CVSS vectors (e.g., CVSS vectors 216A, 216B, 216C described herein with reference to FIGS. 2A-2B) for vulnerabilities to use in scanning a computing environment for the vulnerabilities. The system may be configured to generate, using multiple trained ML models (e.g., ML models 208A-208H described herein with reference to FIGS. 2A-2B) corresponding to respective risk metrics (e.g., an attack vector, an attack complexity, a level of privileges required, whether a user interaction is required, a scope, a confidentiality impact, an integrity impact, and/or an availability impact), a CVSS vector for a vulnerability. The system may be configured to obtain a textual description of the vulnerability (e.g., vulnerability description 212A described herein with reference to FIG. 2A) and generate a CVSS vector using the textual description of the vulnerability and the trained ML models. The system may be configured to generate inputs (e.g., numerical representations of the textual description of the vulnerability) for the trained ML models and provide the inputs to the trained ML models to obtain outputs indicating values of risk metrics (e.g., risk metrics associated with the ML models of FIG. 2A). The system may be configured to store the values of the risk metrics (e.g., string values) in a vector the obtain the CVSS vector (e.g., a CVSS string). The system may be configured to use the CVSS vector to scan one or more computing environments (e.g., by using the CVSS vector to compute one or more risk scores).

In some embodiments, the system may be configured to detect the vulnerability during scanning of the computing environment(s). The system may be configured to perform a remediation function in response to detecting the vulnerability (e.g., applying at least one patch in the computing environment to mitigate risk caused by the at least one vulnerability).

In some embodiments, the plurality of trained ML models comprises a plurality of trained neural networks (e.g., each of the plurality of trained ML models may be a neural network). In some embodiments, the plurality of trained neural networks is a plurality of 1-dimensional (1D) convolutional neural networks (CNNs) (e.g., each of the plurality of trained ML models is a 1D CNN). In some embodiments, each of the plurality of 1D CNNs comprises: an embedding layer; a plurality of convolutional layers; and a plurality of fully-connected layers. In some embodiments, generating the inputs for the plurality of trained ML models comprises: generating numerical representations of words in the textual description of the vulnerability (e.g., vulnerability description embedding 216 described herein with reference to FIG. 2B); and providing the numerical representations of the words to embedding layers of the plurality of neural networks to obtain the plurality of inputs for the plurality of ML models.

In some embodiments, generating the inputs for the plurality of ML models using the textual description of the vulnerability comprises: tokenizing the textual description of the vulnerability to obtain a plurality of tokens; embedding the plurality of tokens using an embedding model to obtain a numerical representation of the textual description of the vulnerability; and providing the inputs to the plurality of machine learning models comprises providing the numerical representation as input to each of the plurality of machine learning models.

In some embodiments, the plurality of trained ML models comprises: a first ML model trained to produce an output indicating a value of a first one of the plurality of risk metrics (e.g., one of ML models 208A-208H described herein with reference to FIG. 2A); and a second ML model trained to produce an output indicating a value of a second one of the plurality of risk metrics (e.g., another one or ML models 208A-208H described herein with reference to FIG. 2A), wherein the second ML model is a different type of ML model than the first ML model.

Figure 3A:
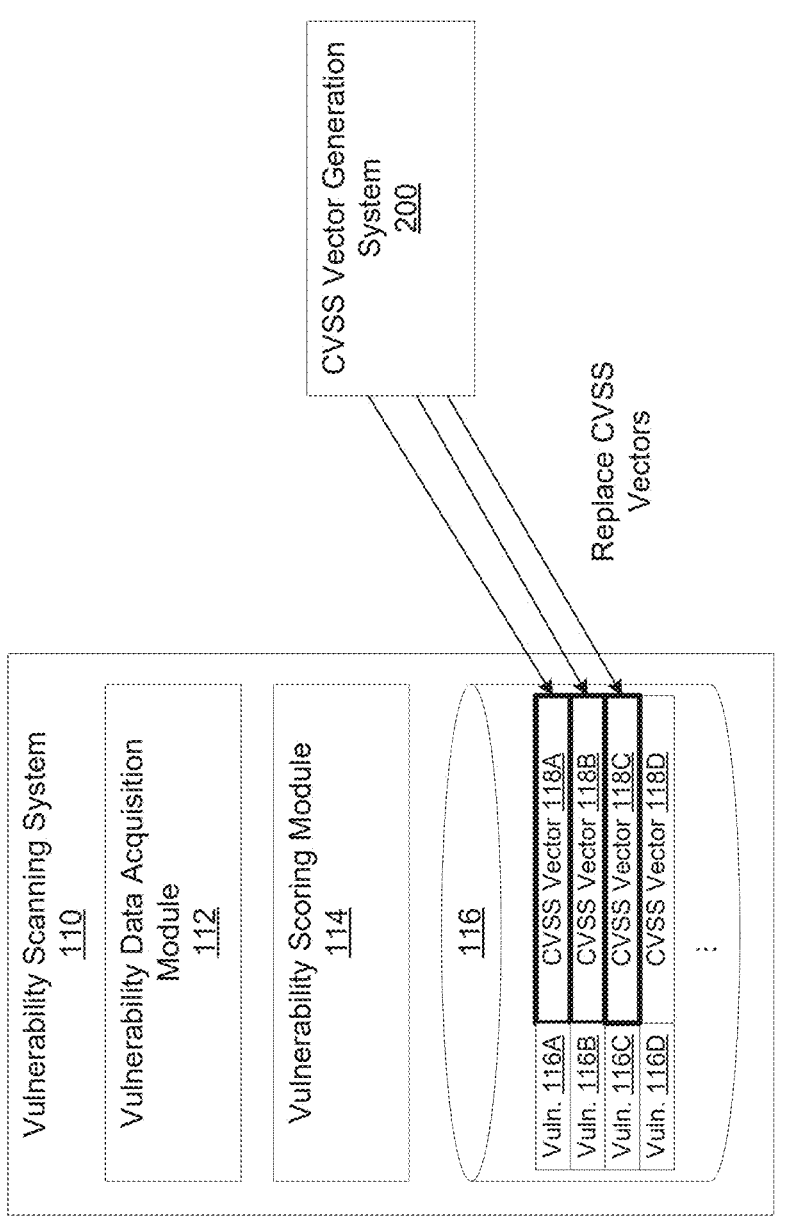
FIG. 3A illustrates replacement of CVSS vectors used by the vulnerability scanning system of FIG. 1, according to some embodiments of the technology described herein.
Figure 3B:
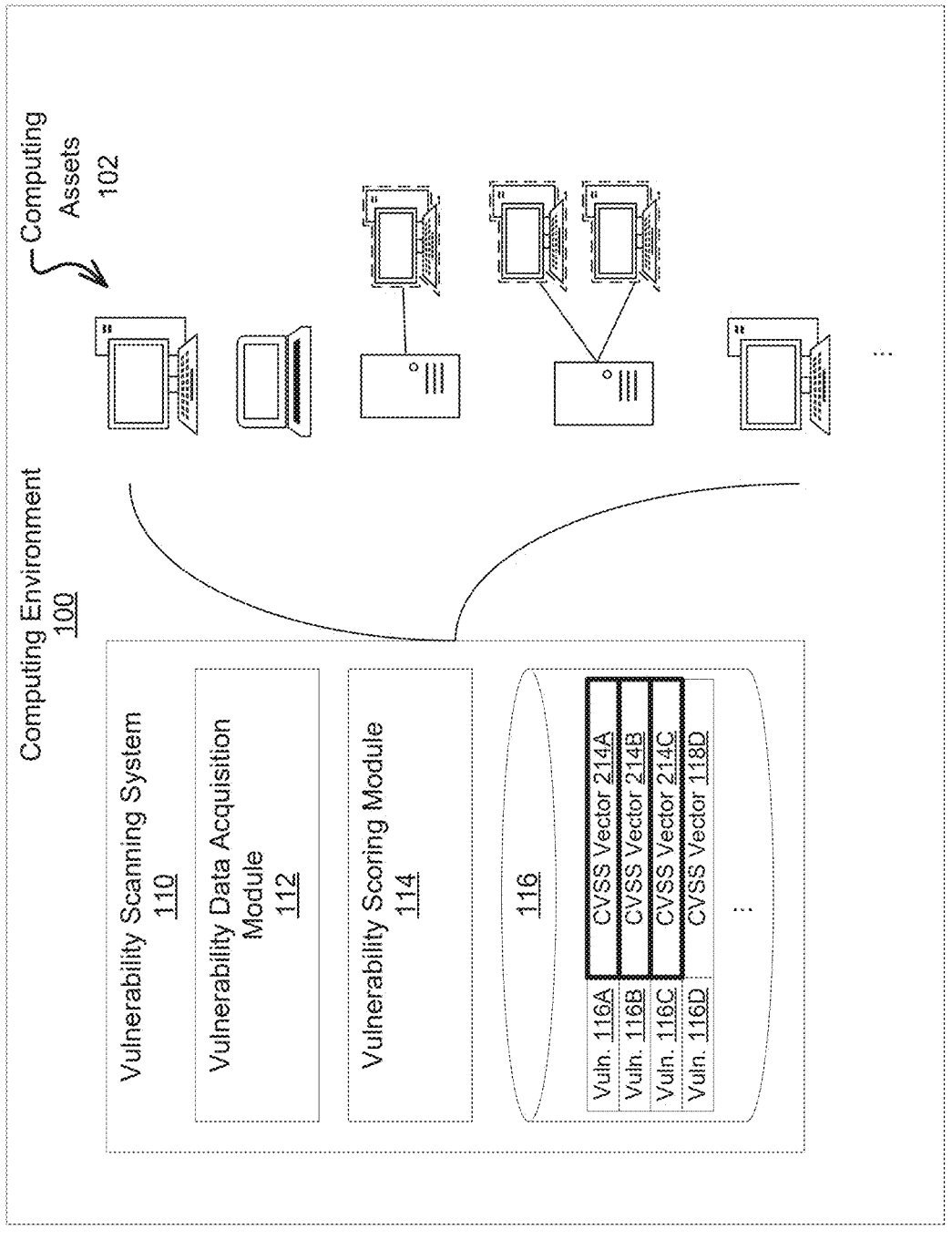
FIG. 3B illustrates the vulnerability scanning system scanning a computing environment for vulnerabilities using the replacement CVSS vectors of FIG. 3A, according to some embodiments of the technology described herein.

In some embodiments, the system may be configured to: replace, in the vulnerability scanning system, one or more default CVSS vectors previously used to scan for the set of one or more vulnerabilities with the one or more generated CVSS vectors (e.g., as illustrated in the example of FIG. 3A); and scan, using the vulnerability scanning system, the computing environment for the set of one or more vulnerabilities after replacing the one or more default CVSS vectors with the one or more generated CVSS vectors (e.g., as illustrated in the example of FIG. 3B).

In some embodiments, the system may be configured to: receive, from at least one computing device, one or more requests to generate the one or more CVSS vectors for the set of one or more vulnerabilities, the one or more requests indicating a textual description of each of the set of one or more vulnerabilities (e.g., requests 210A, 210B, 210C described herein with reference to FIG. 2A); and generating the CVSS vector for each particular vulnerability in the set of one or more vulnerabilities to obtain the one or more CVSS vectors (e.g., CVSS vectors 214A, 214B, 214C described herein with reference to FIG. 2A) in response to receiving the one or more requests.

In some embodiments, the system may be configured to: obtain a training dataset comprising a plurality of CVSS vectors and a plurality of textual descriptions of vulnerabilities associated with the plurality of CVSS vectors; obtain, from the plurality of CVSS vectors, a set of values of each of the plurality of risk metrics thereby obtaining a plurality of sets of risk metric values corresponding to the plurality of risk metrics; and use each of the plurality of sets of risk metric values and the textual descriptions of the vulnerabilities to train a respective ML model to produce an output indicating a value of a risk metric corresponding to the set of risk metric values to obtain the plurality of trained ML models.

Following below are more detailed descriptions of various concepts related to, and embodiments of, malware detection systems and methods developed by the inventors. It should be appreciated that various aspects described herein may be implemented in any of numerous ways. Examples of specific implementations are provided herein for illustrative purposes only. In addition, the various aspects described in the embodiments below may be used alone or in any combination and are not limited to the combinations explicitly described herein.

FIG. 1 illustrates an example computing environment 100 in which some embodiments of the technology described herein may operate. The computing environment 100 includes multiple computing assets 102. The computing assets 102 in the computing environment 100 may be scanned by the vulnerability scanning system. The computing environment 100 includes a vulnerability scanning system 110 configured to scan the computing assets 102 for vulnerabilities. The vulnerability scanning system 110 may determine risk scores for vulnerabilities detected from scanning the computing environment 100 using CVSS vectors associated with the vulnerabilities.

As shown in the example embodiment of FIG. 1, the vulnerability scanning system includes a vulnerability data acquisition module 112, a vulnerability scoring module 114, and a datastore 116. The vulnerability data acquisition module 112 may be configured to obtain vulnerability data from the computing assets 102 for use by the vulnerability scoring module 114 in determining risk scores for detected vulnerabilities.

In some embodiments, the vulnerability data acquisition module 112 may be configured to acquire data from the computing assets 102. The vulnerability data acquisition module 112 may be configured to acquire data in various ways. In some embodiments, the vulnerability data acquisition module 112 may be configured to acquire data using software agents installed on the computing assets 102. The software agents may be configured to execute on the computing assets 102 and collect data during operation. For example, the software agents may obtain information identifying open communication ports, event logs, registry information, system event codes, file version information, resource utilization metrics, information identifying installed applications, and/or other data. In some embodiments, the vulnerability data acquisition module 112 may be configured to acquire data by communicating directly with the computing assets 102. For example, the vulnerability data acquisition module 112 may request data from the computing assets 102 (e.g., through a communication port).

In some embodiments, the vulnerability scoring module 114 may be configured to use the data acquired by the vulnerability data acquisition module 112 to identify vulnerabilities in the computing environment 100. The vulnerability data acquisition module 112 may be configured to process the data to identify vulnerabilities. Example vulnerabilities that may be detected by the vulnerability scoring module 114 may include an outdated security patch for a software application, unauthorized access to data by a user, an improper configuration of an application, compromised credentials, poor encryption of data, and/or another vulnerability.

In some embodiments, the vulnerability data scoring module 114 may be configured to determine a risk score for vulnerabilities identified in the computing environment 110. The vulnerability data scoring module 114 may be configured to determine a risk score for a vulnerability using a CVSS vector associated with the vulnerability. As shown in the example of FIG. 1, the datastore 116 of the vulnerability scanning system 110 includes CVSS vectors 118A, 118B, 118C, 118D associated with respective vulnerabilities 116A, 116B, 116C, 116D. The vulnerability scoring module 114 may be configured to determine a risk score for a vulnerability by: (1) obtaining, from the datastore 116, a CVSS vector associated with the vulnerability, and (2) computing the risk score using the CVSS vector.

In some embodiments, the vulnerability data scoring module 114 may be configured to compute a risk score for a vulnerability using its CVSS vector in one or more ways. In some embodiments, the vulnerability data scoring module 114 may be configured to compute a risk score for a vulnerability using its CVSS vector by: (1) determining risk metric values in the CVSS vector, and (2) determining the risk score using the risk metric values. For example, the vulnerability data scoring module 114 may determine the risk score using the risk metric values with a set of equations. Example equations include CVSS v2.0 equations (defined in the publication "A Complete Guide to the Common Vulnerability Scoring System Version 2.0"). CVSS v3.0 equations (defined in the publication "CVSS v3.0 Specification Document"), CVSS v3.1 equations (defined in the publication "CVSS v3.1 Specification Document"), or the CVSS v4.0 equations (defined in the publication "CVSS version 4.0 Specification Document"). Each of the specification documents is published by the National Institute of Standards and Technology (NIST). In some embodiments, the vulnerability data scoring module 114 may be configured to compute a risk score for a vulnerability using risk metric values in the CVSS vector and additional parameters.

In some embodiments, the vulnerability scanning system 110 may be configured to perform remediation functions based on risk scores computed for vulnerabilities. For example, the vulnerability scanning system 110 may be configured to perform a remediation function to address a particular vulnerability when the risk score associated with the particular vulnerability meets or exceeds a threshold risk score. Example remediation functions that the vulnerability scanning system 110 may be configured to perform based on a risk score computed for a vulnerability include: updating of a software application or configuration, installation of a patch to mitigate the risk posed by a vulnerability, termination of a software application, blocking one or more actions by a software application, limiting data access for a user and/or a software application, activating additional monitoring (e.g., continuous monitoring, additional scanning) of a computing asset, shutting down one or more computing assets, generating an alert for the vulnerability, and/or other remediation functions.

In some embodiments, the vulnerability scoring module 114 may be configured to output risk scores for vulnerabilities detected in the computing environment 100. The vulnerability scoring module 104 may be configured to output the risk scores to a device (e.g., of an administrator that manages security of the computing environment 100). The risk scores may provide an indication of the level of risk posed by the vulnerabilities detected by the vulnerability scanning system 110. In some embodiments, the vulnerability scoring module 114 may be configured to prioritize detected vulnerabilities (e.g., in a list ordered by level of risk) using risk scores computed for the vulnerabilities. The vulnerability scoring module 114 may be configured to present to a user (e.g., in a graphical user interface (GUI)) with the detected vulnerabilities prioritized by the risk score. For example, the vulnerability scoring module 114 may order a listing of the vulnerabilities in the GUI based on the risk scores. As another example, the vulnerability scoring module 114 may apply labels indicating a risk level of the vulnerabilities according to the risk scores (e.g., risk scores about a threshold value may be labeled as "critical"). As another example, the vulnerability scoring module 114 may present vulnerabilities with associated risk scores that meet or exceed a threshold risk score in a GUI while not presenting vulnerabilities that are less than the threshold risk score.

A computing asset of the computing environment 100 may be any addressable physical or virtual device on the computer network. A computing asset may have one or multiple addresses on the computer network. Each address may be of any suitable type and may be used to enable communication to/from the device on the computer network. Non-limiting examples of addresses include an IP address (e.g., an IPV4 or an IPV6 address), a MAC address, an FTP address, an HTTP address, and a hostname. As can be appreciated from the foregoing, when a device has multiple addresses, different addresses may be used to enable communication to/from the device using different communication protocols. Though, some communication protocols may require use of multiple addresses (e.g., IP address and MAC address). Some types of addresses may be assigned by a network (e.g., an IP address). Other types of addresses are not assigned by the network and are particular to a device (e.g., a MAC address). Examples of computing assets which are physical devices include any physical device including any portable device and any fixed device. Non-limiting examples of portable devices include a smartphone, a smartwatch, a tablet computer, a laptop, a speaker, a printer, a camera, or any other suitable network-enabled mobile device. Non-limiting examples of a fixed device include a desktop computer, a rack-mounted computer, a server, a network switch, a network router, or any other network-enabled piece of equipment (e.g., a large printer, a copy machine, a refrigerator, etc.). Internet of Things (IoT) devices such as smart home devices (e.g., smart refrigerators, doorbells, cameras, thermostats, vehicles, security systems) are also examples of physical computing assets. Examples of computing assets which are virtual devices include virtual machines and containers. Virtual machines may virtualize an entire machine down to the hardware layers. Containers may virtualize only software layers above the OS level. One or more containers may share an OS.

Computing environment 100 may be any computing environment that includes one or more computing assets (e.g., physical devices and/or virtual devices). In some embodiments, computing environment 100 may be a cloud computing environment in which each of computing assets 102 is a virtual device (e.g., a virtual machine and/or a container). In some embodiments, computing environment 100 may be a client server environment in which each of computing assets 102 is a physical device that accesses one or more services from a server. In some embodiments, computing environment 100 may be a distributed computing environment in which computing assets 102 are physically distributed nodes that are linked through a network. The nodes may communicate with each other and execute processes together. In some embodiments, computing environment 100 may be a cluster computing environment that includes multiple physical devices working in parallel with one another.

FIG. 2A shows an example of a CVSS vector generation system 200, according to some embodiments of the technology described herein. In some embodiments, the CVSS vector generation system 200 may be configured to generate CVSS vectors for vulnerabilities to be used by the vulnerability scanning system 110 described herein with reference to FIG. 1 (e.g., to compute risk scores for the vulnerabilities as described with reference to the vulnerability scoring module 114). In the example of FIG. 2A, the CVSS vector generation system 200 receives requests 210A, 210B, 210C to generate CVSS vectors for various vulnerabilities. The CVSS vector generation system 200 processes the requests 210A, 210B, 210C to generate the CVSS vectors 214A, 214B, 214C for the vulnerabilities.

As shown in the example embodiment of FIG. 2A, the requests 210A, 210B, 210C each includes a vulnerability description of a particular vulnerability for which the CVSS vector generation system 200 is being requested to generate a CVSS vector. The request 210A includes vulnerability description 212A of a first vulnerability, the request 210B includes vulnerability description 212B of a second vulnerability, and the request 210C includes a vulnerability description 212C of a third vulnerability. In some embodiments, a vulnerability description may be a textual description of the vulnerability (e.g., stored as a string). The textual description of the vulnerability may describe characteristics of the vulnerability such as software versions that the vulnerability affects, potential attacks that may take place due to the vulnerability, results of attacks, and/or other information. Example vulnerability descriptions that may be provided to the CVSS vector generation system 200 are shown below.

1. The vulnerability description 212A may be: "Vulnerability in the Oracle Complex Maintenance, Repair, and Overhaul product of Oracle E-Business Suite (component: LOV). Supported versions that are affected are 12.2.3-12.2.13. Easily exploitable vulnerability allows unauthenticated attacker with network access via HTTP to compromise Oracle Complex Maintenance, Repair, and Overhaul. Successful attacks require human interaction from a person other than the attacker and while the vulnerability is in Oracle Complex Maintenance, Repair, and Overhaul, attacks may significantly impact additional products (scope change). Successful attacks of this vulnerability can result in unauthorized update, insert or delete access to some of Oracle Complex Maintenance, Repair, and Overhaul accessible data as well as unauthorized read access to a subset of Oracle Complex Maintenance, Repair, and Overhaul accessible data."

2. The vulnerability description 212B may be: "The package czproject/git-php before 4.0.3 are vulnerable to Command Injection via git argument injection. When calling the isRemoteUrlReadable($url, array $refs=NULL) function, both the url and refs parameters are passed to the git ls-remote subcommand in a way that additional flags can be set. The additional flags can be used to perform a command injection."

3. The vulnerability description 212C may be: "An issue was discovered in SDDM through 0.17.0. If configured with ReuseSession=true, the password is not checked for users with an already existing session. Any user with access to the system D-Bus can therefore unlock any graphical session. This is related to daemon/Display.cpp and helper/backend/PamBackend.cpp."

The CVSS vector generation system 200 may be configured to generate the CVSS vectors 214A, 214B, 214C by processing the vulnerability descriptions 212A, 212B, 212C. As shown in FIG. 2A, the CVSS vector generation system 200 includes a communication interface 202, a text embedding module 204, a vector generation module 206, and a datastore 208.

The CVSS vector generation system 200 may be configured to obtain the requests 210A, 210B, 210C through the communication interface 202. In some embodiments, the CVSS vector generation system 200 may be configured to connect to a communication network (e.g., the Internet) through the communication interface 202. The CVSS vector generation system 200 may be configured to receive, via the communication interface 202, the requests 212A, 212B, 212C through the Internet. For example, the CVSS generation system 200 may provide a graphical user interface (GUI) (e.g., in an Internet web page or a software application) through which the system 200 may receive requests including vulnerability descriptions. As another example, the CVSS vector generation system 200 may be configured to obtain vulnerability descriptions from another system (e.g., by obtaining the vulnerability descriptions from a storage location remote to the CVSS vector generation system via the communication interface 202).

In some embodiments, the CVSS vector generation system 200 may be configured to automatically obtain vulnerability descriptions for vulnerabilities through the communication interface 202. For example, the CVSS vector generation system 200 may use the communication interface 202 to periodically access a datastore of vulnerability descriptions to: (1) determine if there are any new vulnerability descriptions, and (2) obtain any new detected vulnerability descriptions. Accordingly, the communication interface 202 may provide a pipeline of vulnerability descriptions for processing by the CVSS vector generation system 200.

In some embodiments, the communication interface 202 may include network communication hardware and/or associated software that may be used by the CVSS vector generation system 200 to communicate through a communication network. The hardware and/or software may allow the CVSS vector generation system 200 to exchange information with other systems. In some embodiments, the communication interface 202 may include an application programming interface (API) that may be used to communicate with the CVSS vector generation system 200 (e.g., to send requests and/or receive CVSS vectors). In some embodiments, the communication interface 202 may include a network interface device through which the CVSS vector generation system 200 may communicate with other systems.

In some embodiments, the text embedding module 204 may be configured to embed vulnerability descriptions as respective numerical representations. For example, the text embedding module 204 may embed a vulnerability description as a vector, matrix, or other data structure of numerical values. In the example of FIG. 2A, the text embedding module 204 may be configured to embed the vulnerability description 212A as a first numerical representation, the vulnerability description 212B as a second numerical representation, and the vulnerability description 212C as a third numerical representation.

In some embodiments, the text embedding module 204 may be configured to pre-process a textual description of a vulnerability. The text embedding module 204 may be configured to modify the textual description during pre-processing. For example, the text embedding module 204 may remove certain words (e.g., stop words) and/or lowercase all the words in the textual description. As another example, the text embedding module 204 may remove portions (sentences) of the textual description related to CVSS.

In some embodiments, the text embedding module 204 may be configured to embed a vulnerability description into a numerical representation (e.g., a vector, matrix, or other data structure of numerical values). The text embedding module 204 may be configured to embed the vulnerability description using an embedding model. The text embedding module 204 may be configured to embed the vulnerability description using the embedding model by: (1) determining numerical representations of words in the vulnerability description. (2) generating input to the embedding model using the numerical representations of the words, and (3) providing the input to the embedding model to obtain the numerical representation of the vulnerability description.

In some embodiments, the text embedding module 204 may be configured to determine numerical representations of words in a vulnerability description. The text embedding module 204 may be configured to determine the numerical representations by: (1) tokenizing the textual description to obtain multiple tokens, and (2) determining numerical representations of the tokens. In some embodiments, the text embedding module 204 may be configured to determine the numerical representations of the tokens using an embedding model. For example, the text embedding module 204 may determine the numerical representations using a FastText embedding model, a Word2Vec embedding model, a GloVe embedding model, or another embedding model. In some embodiments, the text embedding module 204 may be configured to determine the numerical representations of the words by obtaining pre-trained embeddings of the words. For example, the text embedding module 204 may obtain pre-trained FastText embeddings of the words as numerical representations.

In some embodiments, the text embedding module 204 may be configured to generate the numerical representation of the vulnerability description using numerical representations of words (e.g., dense vector representations of words) in the description. The text embedding module 204 may be configured to provide the numerical representations of the words as input to an embedding model to obtain a numerical representation of the vulnerability description as output. For example, the text embedding module 204 may store numerical representations of the words in a data structure (e.g., a vector, matrix, or other data structure), and provide the data structure as input to an embedding model to obtain the numerical representation of the vulnerability description. In some embodiments, the embedding model may be a neural network. In some embodiments, the embedding model may be a layer of an ML model trained to produce output indicating a CVSS risk metric value (e.g., one of ML models 208A, 208B, 208C, 208D, 208E, 208F, 208G). For example, the embedding model may be an embedding layer of a convolutional neural network (CNN) which generates input to one or more convolutional layers of the CNN.

In some embodiments, the vector generation module 206 may be configured to generate a CVSS vector for each of the requests 210A, 210B, 210C (e.g., in response to each of the requests). The vector generation module 206 may be configured to generate the CVSS vector 214A based on vulnerability description 212A, CVSS vector 214B based on vulnerability description 212B, and CVSS vector 214C based on vulnerability description 212C. The vector generation module 206 may be configured to generate a CVSS vector based on a given vulnerability description by using a numerical representation of the vulnerability description generated by the text embedding module 204. For example, the vector generation module 206 may generate the CVSS vector using embeddings of words (e.g., numerical vectors or matrices representing the words) in the vulnerability description. As another example, the vector generation module 206 may generate the CVSS vector using an embedding of the vulnerability description (e.g., numerical vector or matrix representing the vulnerability description).

In some embodiments, the vector generation module 206 may be configured to generate the CVSS vectors 214A, 214B, 214C using multiple different ML models each trained to produce output indicating a value of a risk metric. In the example of FIG. 2A, the ML models include the models stored in the datastore 208, where each ML model is trained to produce output indicating a value of a risk metric indicated by a CVSS 3.1 vector. The risk metrics indicated by a CVSS 3.1 vector include attack vector (AV), attack complexity (AC), privileges required (PR), user interface (UI), scope, confidentiality impact (CI), integrity impact (II), and availability impact (AI). Accordingly, the ML models stored in the datastore 208 include: (1) an AV prediction model 208A, (2) an AC prediction model 208B, (3) a PR prediction model 208C, (4) a UI prediction model 208D, (5) a scope prediction model 208E, (6) a CI prediction model 208F, (7) an II prediction model 208G, and (8) an AI prediction model 208H.

In some embodiments, the datastore 208 may comprise storage hardware storing parameters of the trained ML models 208A, 208B, 208C, 208D. 208E, 208F. 208G, 208H. The storage hardware may include one or more hard drives (e.g., disk drives, solid state drives, and/or other types of hard drives). Although in the example of FIG. 200 the datastore 208 is shown as part of the CVSS vector generation system 200, in some embodiments, the datastore 208 may be separate from the system 200. For example, the datastore 208 may be in data storage remote from the CVSS generation system 200 (e.g., a remote datacenter and/or cloud-based storage).

FIG. 2B illustrates generation of the CVSS vector 214A by the CVSS vector generation system 200 of FIG. 2A, according to some embodiments of the technology described herein. As shown in FIG. 2B, the text embedding model 204 generates a vulnerability description embedding 216 of the vulnerability description 212A included in the request 210A. The vector generation module 206 uses the vulnerability description embedding 216 to generate inputs for the ML models 208A, 208B, 208C, 208D, 208E, 208F, 208G, 208H.

In some embodiments, the vector generation module 206 may be configured to generate the same input for all the ML models. For example, the vulnerability description embedding 216 may be a numerical representation of the vulnerability description 212A (e.g., obtained by tokenizing the vulnerability description 212A and embedding tokens using an embedding model to obtain the numerical representation of the vulnerability description 212A) and the vector generation module 206 may provide the numerical representation as input to each of the ML models. In some embodiments, the vector generation module 206 may be configured to generate a separate input for each of at least some of the ML models. For example, the vulnerability description embedding 216 may comprise numerical representations of words in the vulnerability description 212A (e.g., FastText embeddings). The vector generation module 206 may provide the numerical representations of the words as inputs to respective embedding models (e.g., embedding layers) of the ML models to obtain inputs for the ML models. As another example, each of at least some of the ML models may be trained to receive a different input (e.g., a different set of features). The different inputs may have different characteristics (e.g., different sizes/dimensions, different values that they may take on, different data structures, and/or other differences). The vector generation module 206 may generate an input for each of the ML models using the vulnerability description embedding 216.

In the example of FIGS. 2A-2B, the ML models may be trained to produce outputs as follows. The string in the parentheses following each of the risk metric output values value is an example value that may be stored in a CVSS vector to indicate the risk metric value. For example, each of the ML models may produce an integer value indicating a particular risk metric value.

1. The AV prediction model 208A may be trained to produce an output indicating one of the following values: network ("AV:N"), adjusted network ("AV:A"), local ("AV:L"), or physical ("AV:P").
2. The AC prediction model 208B may be trained to produce an output indicating one of the following values: low ("AC:L"), or high ("AC:H").

3. The PR prediction model 208C may be trained to produce an output indicating one of the following values: none ("PR:N"), low ("PR:L"), or high ("PR:H").
4. The UI prediction model 208D may be trained to produce an output indicating one of the following values: none ("UI:R"), or required ("UI:R").
5. The scope prediction model 208E may be trained to produce an output indicating one of the following values:unchanged ("S:U"), or changed ("S:C").
6. The CI prediction model 208F may be trained to produce an output indicating one of the following values: none ("C:N"), low ("C:L"), or high ("C:H").
7. The II prediction model 208G may be trained to produce an output indicating one of the following values: none ("I:N"), low ("I:L"), or high ("I:H").
8. The AI prediction model 208H may be trained to produce an output indicating one of the following values: none ("A:N"), low ("A:L"), or high ("A:H").

As illustrated in FIG. 2A, the vector generation module 206 may be configured to provide generated inputs to the ML models 208A, 208B, 208C, 208D, 208E, 208F, 208G, 208H to obtain outputs indicating risk metric values. The outputs indicate an AV value 218A, an AC value 218B, a PR value 218C, a UI value 218D, a scope value 218E, a CI value 218F, an II value 218G, and an AI value 218H. In some embodiments, the risk metric values indicated by the outputs of the ML models may be strings (e.g., as described in the listing of example risk metric values above). In some embodiments, the risk metric values indicated by the outputs of the ML models may be numerical values. In some embodiments, the risk metric values indicated by the outputs of the ML models may be alphanumerical values.

As illustrated in FIG. 2B, the vector generation module 206 may be configured to generate the CVSS vector 214A using the risk metric values indicated by the outputs obtained from the ML models. In some embodiments, the vector generation module 206 may be configured to store the risk metric values at respective positions in a matrix. For example, the vector generation module 206 may store string risk metric values in positions in a CVSS 3.1 vector corresponding to each risk metric. This is illustrated in the example of FIG. 2B where the AV value 218A is stored as the first entry of the CVSS vector 214A, the AC value 218B as the second entry, the PR value 218C as the third entry, the UI value 218D as the fourth entry, the scope value 218E as the fifth entry, the CI value 218F as the sixth entry, the II value 218G as the seventh entry, and the AI value 218H as the eight entry. As an illustrative example, the CVSS vector 214A generated for the vulnerability description 212A may be "CVSS:3.1/AV:N/AC:L/PR:N/UI:R/S:C/C:L/I:L/A:N". As another example, the CVSS vector 214B generated for the vulnerability description 212B may be "CVSS:3.1/AV:N/AC:L/PR:N/UI:N/S:U/C:H/I:H/A:H". As another example, the CVSS vector 214C generated for the vulnerability description 212C may be "CVSS:3.1/AV:N/AC:L/PR:L/UI:N/S:U/C:H/I:H/A:H". Each of these example CVSS vectors may correspond to the example vulnerability descriptions 212A, 212B, 212C described above.

In some embodiments, an ML model trained to produce output indicating a value of a particular risk metric may be any suitable ML model. For example, an ML model may be a naïve bayes (NB) model, a large language model (LLM) (e.g., the Claude 3.5 model developed by ANTHROPIC®), a logistic regression model, a random forest model, a support vector machine (SVM), a gradient boosted decision tree model, or a neural network model. In one example implementation, an ML model may be a 1D convolutional neural network (CNN). The CNN may include an embedding layer, one or more convolutional layers, and one or more fully connected layers. The CNN may have between 1 and 10 convolutional layers (e.g., 1D convolutional layers), or another suitable number of convolutional layers. For example, the CNN may have 3 convolutional layers. Each of the convolutional layers may include 1-25 filters, 25-50 filters, 50-75 filters, 75-100 filters, 100-125 filters, 125-150 filters, 150-175 filters, 175-200 filters, or another suitable number of filters. Each of the convolutional layers may have a filter size of 2×2, 3×3, 4×4, 5×5, 6×6, 7×7, 8×8, 9×9, 10×10, or another suitable filter size. The CNN may have a max-pooling layer after each convolutional layer. The CNN may use an activation function (e.g., ReLu, sigmoid, or another activation function) for each convolutional layer. The CNN may have between 1 and 10 fully connected layers. For example, the CNN may have 3 fully connected layers. The output of the final fully connected layer may output logits for different risk metric values. In some embodiments, a dropout layer may be applied before each fully connected layer. The CNN may have 500-600 bias terms, 600-700 bias terms, 700-800 bias terms, 800-900 bias terms, or 900-1000 bias terms. For example, the CNN may have 753 bias terms. The CNN may output a numerical value (e.g., an integer value) indicating a risk metric value. For example, the CNN may output 0) indicating a first risk metric value, 1 indicating a second risk metric value, 2 indicating a third risk metric value, or 3 indicating a fourth risk metric value.

In some embodiments, each of at least some of the ML models 208A, 208B, 208C, 208D, 208E, 208F, 208G, 208H may be different types of ML models. Example types of ML models are described herein. In some embodiments, all of the ML models 208A, 208B, 208C, 208D, 208E, 208F, 208G, 208H may be the same type of model (e.g., they may all be CNNs). In some embodiments, each of at least some of the ML models may have different architectures (e.g., a different number of convolutional layers and/or a different number of fully connected layers). In some embodiments, each of the ML models may have the same architecture (e.g., the same number of convolutional layers and/or number of fully connected layers).

In some embodiments, the trained ML models 208A, 208B, 208C, 208D, 208E, 208F, 208G, 208H may be trained using a training dataset comprising CVSS vectors (e.g., that were previously generated) and textual descriptions associated with the CVSS vectors. The CVSS vectors may include risk metric values that are target outputs (e.g., labels) of the trained ML models. A set of values for each of the risk metrics (e.g., AV, AC, PR, UI, scope, CI, II, and AI) may be obtained from the CVSS vectors thereby obtaining multiple sets of risk metric values corresponding to respective risk metrics. An ML model may be trained using each of the sets of risk metric values and the corresponding textual descriptions to obtain the trained ML models 208A, 208B, 208C, 208D, 208E, 208F, 208G, 208H. Accordingly, a single training dataset of CVSS vectors and vulnerability descriptions may be used to train all the ML Models.

Each of the ML models 208A, 208B, 208C, 208D, 208E, 208F, 208G, 208H may be trained using a suitable training technique. In some embodiments, each of the ML models is trained using a supervised learning technique. The supervised learning technique may be applied to a training data consisting of vulnerability descriptions and previously generated CVSS vectors (e.g., by humans or another ML model) corresponding to the vulnerability descriptions. For example, an ML model may be trained using stochastic gradient descent. The vulnerability descriptions and/or embeddings thereof may be provided as inputs to the ML model to obtain outputs. The risk metric values indicated by the outputs may be compared to risk metric values in the corresponding CVSS vectors of the training data. Parameters of the ML model may be updated based on a difference between risk metric values indicated by the outputs and those in the CVSS vectors (e.g., by adjusting the parameters by a fraction of a gradient). For example, a loss function (e.g., cross entropy loss, log loss, hinge loss, or another suitable loss function) may be used to quantify the difference. In some embodiments, the stochastic gradient descent may employ a gradient descent optimization algorithm (e.g., Adagrad optimization described in Duchi, J., Hazan, E., & Singer, Y. (2011). Adaptive Subgradient Methods for Online Learning and Stochastic Optimization. Journal of Machine Learning Research, 12, 2121-2159).

In some embodiments, parameters of an ML model may be initialized to values prior to application of a learning technique (e.g., a supervised learning technique). The parameters of the ML model may be initialized using any suitable technique. For example, for a CNN the convolutional layers may be initialized using Kaiming initialization described in He, Kaiming, et al. "Delving deep into rectifiers: Surpassing human-level performance on imagenet classification." Proceedings of the IEEE international conference on computer vision. 2015. The fully connected layers may be initialized using uniform Xavier uniform initialization described in Glorot, Bengio. "Understanding the difficulty of training deep feedforward neural networks." Proceedings of the Thirteenth International Conference on Artificial Intelligence and Statistics, PMLR 9:249-256, 2010.

In some embodiments, various ML models may be tested after training to identify the best-performing ML model to predict a particular risk metric value. The ML models may be tested on a test dataset comprising vulnerability descriptions and corresponding CVSS vectors. For example, the test dataset may be generated using a dataset of common vulnerabilities and exposures (CVEs) that includes vulnerability descriptions and corresponding CVSS vectors (e.g., that were previously generated). A number (e.g., 100-1000, 1000-5000, 5000-10000, 10000-15000, 15000-20000, 20000-30000, a number in any of the ranges, or another suitable number) of vulnerabilities are sampled from the CVEs to obtain the test dataset. The vulnerability descriptions may be used to generate inputs for the different ML models. For example, the vulnerability descriptions may be embedded and provided as input to one or more of the ML models. As another example, the vulnerability description may be provided as input with a prompt requesting a predicted CVSS vector (e.g., to an LLM). The ML models may produce outputs. To determine the performance of the ML models, the predicted risk metric values obtained from the ML models may be compared to risk metric values indicated by CVSS vectors corresponding to the vulnerability descriptions used as inputs. Any suitable measure of performance may be used to quantify performance of the ML models. For example, the accuracy of each ML model's predictions may be quantified. Table I below shows an example set of accuracies for different ML models trained to predict values of the CI risk metric.

TABLE 1

| ML Model | Accuracy |
| --- | --- |
| Naïve Bayes | 79.2% |
| LLM (Claude Sonnet 3.5) | 82.8% |
| Logistic Regression | 86.7% |
| Random Forest | 86.2% |
| Support Vector Machine | 87.6% |
| CNN | 91.9% |

In some embodiments, a set of ML models (e.g., ML models 208A, 208B, 208C, 208D, 208E, 208F, 208G, 208H) selected to predict values of risk metrics may also be tested for performance in generating an entire CVSS vector. The CVSS vectors generated using vulnerability descriptions in a set of test data may be compared to known CVSS vectors corresponding to the vulnerability descriptions. The accuracy of the set of ML models may be quantified (e.g., by determining an accuracy and/or other measure(s) of performance). In some embodiments, different sets of ML models may be tested for performance and a set of models that performs the highest on the test data may be used to generate CVSS vectors for a vulnerability scanning system.

FIG. 3A illustrates the replacement of CVSS vectors used by the vulnerability scanning system 110 described herein with reference to FIG. 1, according to some embodiments of the technology described herein. As illustrated in FIG. 3A, in some embodiments, the CVSS vector generation system 200 (described herein with reference to FIGS. 2A-2B) may be configured to replace CVSS vectors in the datastore 116 of the vulnerability scanning system 110. In the example of FIG. 3A, the CVSS vector generation system 200 replaces CVSS vectors 118A, 118B, 118C corresponding to respective vulnerabilities 116A, 116B, 116C. The CVSS vector generation system 200 replaces CVSS vector 118A with generated CVSS vector 214A, CVSS vector 118B with generated CVSS vector 214B, and CVSS vector 118C with CVSS vector 214C. For example, each of the CVSS vectors 118A, 118B, 118C may be default vectors that do not accurately indicate the risk metric values for the respective vulnerabilities (e.g., that were used because there were no CVSS vectors available for the vulnerabilities 116A, 116B, 116C). The generated CVSS vectors 214A, 214B, 214C may more accurately indicate risk metric values of the vulnerabilities 116A, 116B, 116C. Accordingly, the CVSS vectors 214A, 214B, 214C may improve vulnerability scanning performed for the vulnerabilities 116A, 116B, 116C.

FIG. 3B illustrates the vulnerability scanning system 110 scanning the computing environment 100 for vulnerabilities using the CVSS vectors 214A, 214B, 214C in place of CVSS vectors 118A, 118B, 118C. In some embodiments, the vulnerability scanning system 110 may be configured to use the CVSS vectors 214A, 214B, 214C to determine one or more risk scores for each of the vulnerabilities 116A, 116B, 116C (e.g., as described with reference to vulnerability scoring module 114 in FIG. 1). Risk scores computed using the CVSS vectors 214A, 214B, 214C may more accurately reflect the risk of the vulnerabilities 116A, 116B, 116C than risk scores computed using the CVSS vectors 118A, 118B, 118C. The more accurate risk scores may result in improved remediation performed by the vulnerability scanning system 110. Example remediation functions that may be performed by the vulnerability scanning system 110 based on a risk score are described herein with reference to FIG. 1.

Figure 4:
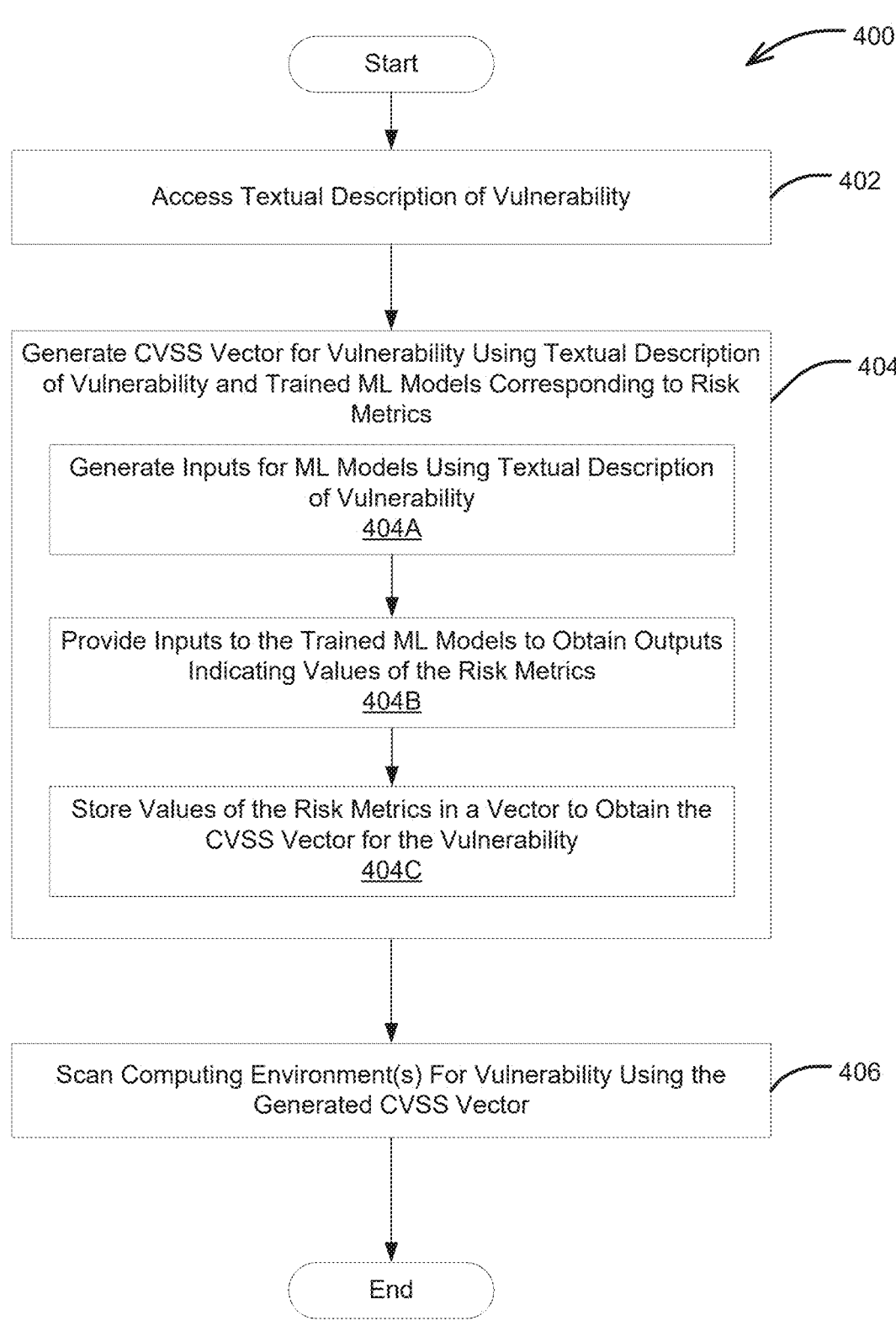
FIG. 4 shows an example process for generating CVSS vectors for vulnerabilities to use in scanning a computing environment for the vulnerabilities, according to some embodiments of the technology described herein.

FIG. 4 is an example process 400 for generating CVSS vectors for vulnerabilities to use in scanning a computing environment for the vulnerabilities, according to some embodiments of the technology described herein. In some embodiments, process 400 may be performed by CVSS vector generation system 200 described herein with reference to FIGS. 2A-2B. In some embodiments, the system may be configured to perform process 400 for each of a set of one or more vulnerabilities. For example, the system may perform process 400 for a set of one or more vulnerabilities for which the system does not have CVSS vectors or is otherwise using a default CVSS vector. As another example, the system may perform process 400 in response to obtaining an indication of a new vulnerability (e.g., in a security advisory) and determining that there is not CVSS vector available for the new vulnerability.

Process 400 begins at block 402, where the system obtains a textual description of a vulnerability (also referred to herein as a "vulnerability description"). In some embodiments, the system may be configured to obtain the vulnerability description by: (1) receiving a request to generate a CVSS vector, where the request includes the vulnerability description (e.g., request 210A described herein with reference to FIG. 2A), and (2) obtain the vulnerability description from the request. For example, the system may receive the request through a GUI of a webpage. In some embodiments, the system may be configured to obtain the vulnerability description by: (1) obtaining a set of vulnerability descriptions (e.g., in a file or other data object), and (2) obtaining the vulnerability description from the set (e.g., by reading the vulnerability description from a file or other data object). In some embodiments, the system may be configured to obtain the vulnerability from an external source. For example, the system may obtain the vulnerability description from one or more web pages.

Next, at block 404, the system generates the CVSS vector for the vulnerability using the textual description of the vulnerability obtained at block 402 and multiple trained ML models (e.g., ML models 208A, 208B, 208C, 208D, 208E, 208F, 208G, 208H described herein with reference to FIGS. 2A-2B) corresponding to risk metrics. Each of the trained ML models may be trained to produce output indicating a value of a respective risk metric. As shown in FIG. 4, the block 404 includes sub-blocks 404A-404C.

At block 404A, the system generates inputs for the ML models using the textual description of the vulnerability. In some embodiments, the system may be configured to generate the inputs for the ML models using the textual description of the vulnerability by: (1) generating an embedding of the vulnerability description (e.g., a numerical representation of the vulnerability description), and (2) generating the inputs using the embedding of the vulnerability description. For example, the system may generate the embedding of the vulnerability description by: (1) tokenizing the vulnerability description to obtain tokens, and (2) embedding the tokens using an embedding model to obtain a numerical representation of the vulnerability description. As another example, the system may generate the embedding of the vulnerability description by: (1) generating numerical representations of words in the vulnerability description, and (2) providing the numerical representations of the words as input to embedding models (e.g., embedding layers of the ML models) to obtain to obtain inputs to the ML models. Example techniques of generating inputs for the ML models are described herein with reference to text embedding module 204 and vector generation module 206 in FIGS. 2A-2B.

At block 404B, the system provides the inputs to the trained ML models to obtain outputs indicating values of the risk metrics. For example, the system may provide embeddings of the vulnerability description as inputs to the trained ML models to obtain the outputs. To illustrate, one or more of the ML models may be a CNN. The system may provide an embedding of the vulnerability description to a CNN to obtain output indicating a value of a risk metric. In some embodiments, each of the ML models may produce an output indicating a value of one of a plurality of risk metrics (e.g., CVSS 3.1 risk metrics or CVSS 4.0 risk metrics). Example techniques for providing input to a trained ML model are described herein with reference to FIG. 2B. In some embodiments, the system may be configured to obtain output numerical values (e.g., integers) from the trained ML models indicating risk metric values. For example, the output numerical values may represent string values of the risk metrics. Example such string values are described herein with reference to FIGS. 2A-2B.

In some embodiments, each of the trained ML models may be trained using a training dataset comprising CVSS vectors (e.g., that were previously generated) and textual descriptions associated with the CVSS vectors. The CVSS vectors may include risk metric values that are target outputs (e.g., labels) of the trained ML models. A set of values for each of the risk metrics may be obtained from the CVSS vectors thereby obtaining multiple sets of risk metric values corresponding to respective risk metrics. An ML model may be trained using each of the sets of risk metric values to obtain the trained ML models. Example techniques for training an ML model are described herein with reference to FIGS. 2A-2B. To illustrate, each of the trained ML models may be 1D CNNs that were trained by performing stochastic gradient descent using a cross entropy loss function.

At block 404C, the system stores values of the risk metrics indicated by the outputs of the trained ML models in a vector to obtain the CVSS vector for the vulnerability. In some embodiments, the system may be configured to store risk metric values in respective locations of the vector (e.g., as described herein with reference to CVSS vector 214A in FIG. 2B). For example, each location in the vector may correspond to a particular risk metric. The system may store a value of a particular risk metric in its corresponding location in the vector. To illustrate, the system may store a string value in each location of the vector.

In some embodiments, the system may be configured to augment the generated CVSS vector with one or more additional risk metric values. For example, the CVSS vector generated at block 404C may not include values for certain risk metrics. To illustrate, the CVSS vector generated at block 404C may be a CVSS 3.1 vector and the system may need to generate a CVSS 4.0 vector which includes additional risk metrics relative to the CVSS 3.1 vector. The system may augment the CVSS 3.1 vector with additional risk metric value(s) to obtain a CVSS 4 vector. In some embodiments, the system may be configured to augment the CVSS vector with additional risk metric value(s) using a large language model (LLM). For example, the system may provide the generated CVSS vector as input to the LLM with a prompt requesting the LLM to provide additional information (e.g., additional risk metric values). The system may obtain output from the LLM indicating the additional information and update the CVSS vector (e.g., by augmenting it with information obtained from the LLM).

After block 404, process 400 proceeds to block 406, where the system uses the vulnerability scanning system to scan one or more computing environments using the generated CVSS vector. In some embodiments, the system may be configured to replace a CVSS vector that was previously used by the vulnerability scanning system for scanning for the vulnerability (e.g., as described herein with reference to FIGS. 3A-3B). For example, the system may replace a default CVSS vector that was previously associated with the vulnerability with the generated CVSS vector. In some embodiments, the system may be configured to use the generated CVSS vector to compute one or more risk scores for the vulnerability when scanning the computing environment(s).

In some embodiments, the system may be configured to use computed risk score(s) to perform one or more remediation functions. Example remediation functions that may be performed based on the risk score(s) are described herein. In some embodiments, the system may be configured to trigger a particular remediation function based on the risk score(s). For example, the system may be configured to perform different remediation functions for different ranges of risk scores. As another example, the system may be configured to trigger the performance of one or more remediation functions when a risk score meets a threshold risk score.

Figure 5:
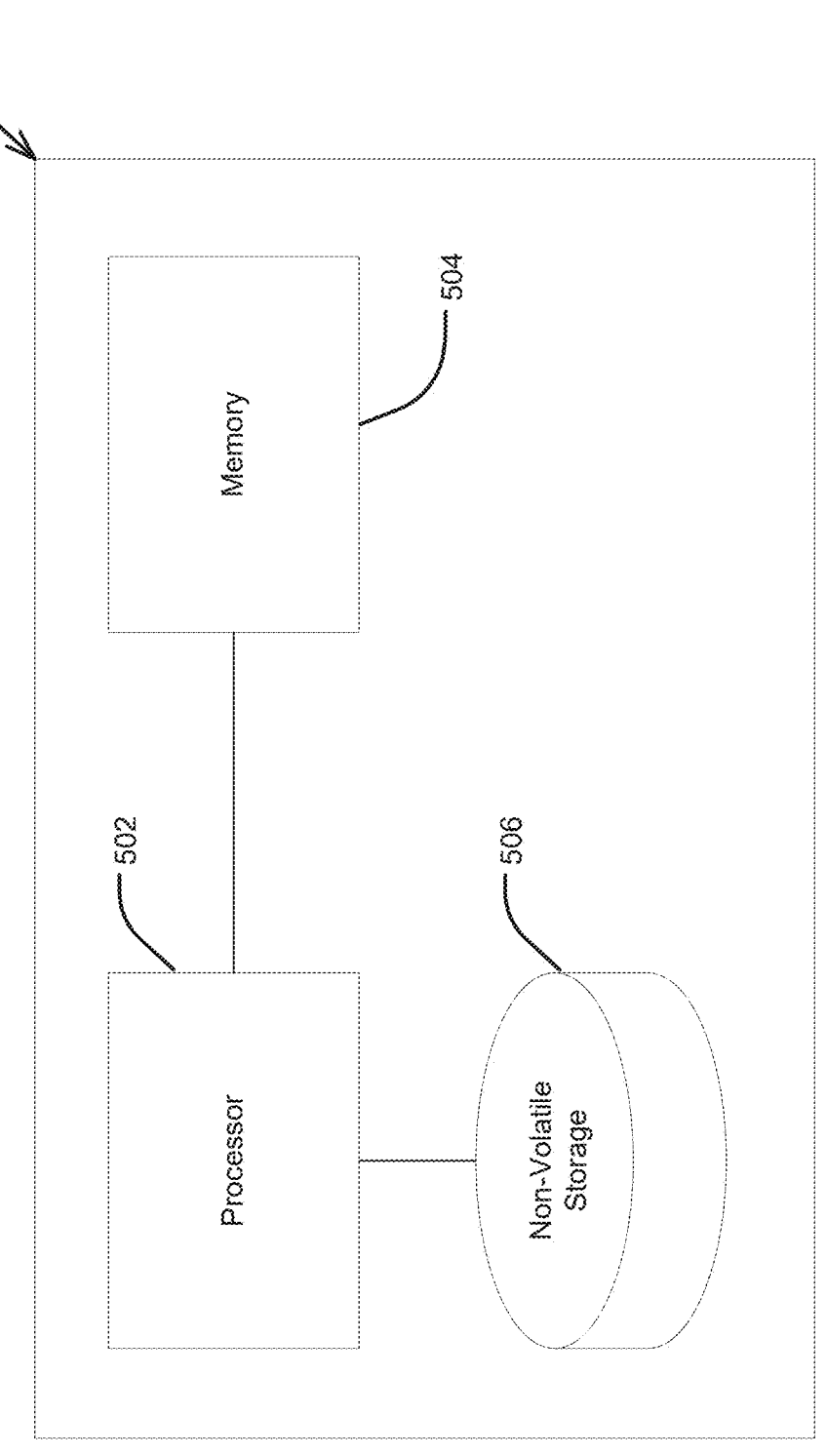
FIG. 5 shows a block diagram of an exemplary computing device that may be specially configured to implement some embodiments of the technology described herein.

FIG. 5 shows a block diagram of an exemplary computing device 500 that may be specially configured to implement some embodiments of the technology described herein. For example, the computing device 500 may be configured to implement the vulnerability scanning system 110 described herein with reference to FIGS. 1 and FIGS. 3A-3B. As another example, the computing device 500 may be configured to implement the CVSS generation system 200 described herein with reference to FIGS. 2A-2B. As another example, the computing device 500 may be configured to perform the process 400 described herein with reference to FIG. 4.

The computer system 500 may include one or more computer hardware processors 502 and non-transitory computer-readable storage media (e.g., memory 504 and one or more non-volatile storage 504). The processor(s) 502 may control writing data to and reading data from (1) the memory 504; and (2) the non-volatile storage device(s) 506. To perform any of the functionality described herein, the processor(s) 502 may execute one or more processor-executable instructions stored in one or more non-transitory computer-readable storage media (e.g., the memory 504), which may serve as non-transitory computer-readable storage media storing processor-executable instructions for execution by the processor(s) 502.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform tasks or implement abstract data types. Typically, the functionality of the program modules may be combined or distributed.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for generating common vulnerability scoring system (CVSS) vectors of vulnerabilities for use by a vulnerability scanning system in scanning a computing environment for the vulnerabilities, each particular one of the CVSS vectors comprising values of a plurality of risk metrics determined for a vulnerability associated with the particular CVSS vector, the method comprising:

using at least one computer hardware processor to perform:

generating, using a plurality of trained machine learning (ML) models corresponding to the plurality of risk metrics, a CVSS vector for each particular vulnerability in a set of one or more vulnerabilities to obtain one or more CVSS vectors, the generating comprising:

obtaining a textual description of the particular vulnerability;

generating a CVSS vector for the particular vulnerability using the textual description of the particular vulnerability and the plurality of trained ML models corresponding to the plurality of risk metrics, each of the plurality of trained ML models having been trained to produce an output indicating a value of a respective one of the plurality of risk metrics for the particular vulnerability, the generating comprising:

generating inputs for each of the plurality of ML models using the textual description of the particular vulnerability, the generating comprising:

tokenizing the textual description of the vulnerability to obtain a plurality of tokens; and embedding the plurality of tokens using an embedding model to obtain a numerical representation of the textual description of the vulnerability;

providing the inputs to the plurality of ML models to obtain outputs indicating values of the plurality of risk metrics for the particular vulnerability, the providing comprising providing the numerical representation as input to each of the plurality of ML models; and storing the values of the plurality of risk metrics indicated by the outputs of the plurality of ML models in a vector to obtain the CVSS vector for the particular vulnerability;

scanning, using the vulnerability scanning system, the computing environment for one or more vulnerabilities in the set of one or more vulnerabilities using the one or more CVSS vectors generated for the set of one or more vulnerabilities;

detecting at least one of the set of one or more vulnerabilities in the computing environment during the scanning; and in response to detecting the at least one vulnerability in the computing environment:

applying at least one patch in the computing environment to mitigate risk caused by the at least one vulnerability.

2. The method of claim 1, wherein the plurality of trained ML models comprises a plurality of trained neural networks.

3. The method of claim 2, wherein the plurality of trained neural networks is a plurality of 1-dimensional (1D) convolutional neural networks (CNNs).

4. The method of claim 3, wherein each of the plurality of 1D CNNs comprises:

an embedding layer;

a plurality of convolutional layers; and a plurality of fully-connected layers.

5. The method of claim 2, wherein:

generating the inputs for the plurality of trained ML models comprises:

generating numerical representations of words in the textual description of the vulnerability; and

providing the numerical representations of the words to embedding layers of the plurality of neural networks to obtain the plurality of inputs for the plurality of ML models.

6. The method of claim 1, wherein the plurality of trained ML models comprises:

a first ML model trained to produce an output indicating a value of a first one of the plurality of risk metrics; and a second ML model trained to produce an output indicating a value of a second one of the plurality of risk metrics, wherein the second ML model is a different type of ML model than the first ML model.

7. The method of claim 1, wherein the plurality of trained ML models comprises one or more of a naïve Bayes (NB) model, a large language model (LLM), a logistic regression model, a random forest model, a gradient-boosted decision tree, a support vector machine (SVM), or a neural network.

8. The method of claim 1, further comprising:

replacing, in the vulnerability scanning system, one or more default CVSS vectors previously used to scan for the set of one or more vulnerabilities with the one or more generated CVSS vectors; and scanning, using the vulnerability scanning system, the computing environment for the set of one or more vulnerabilities after replacing the one or more default CVSS vectors with the one or more generated CVSS vectors.

9. The method of claim 1, further comprising:

receiving, from at least one computing device, one or more requests to generate the one or more CVSS vectors for the set of one or more vulnerabilities, the one or more requests indicating a textual description of each of the set of one or more vulnerabilities; and generating the CVSS vector for each particular vulnerability in the set of one or more vulnerabilities to obtain the one or more CVSS vectors in response to receiving the one or more requests.

10. The method of claim 1, wherein the plurality of risk metrics comprises an attack vector, an attack complexity, a level of privileges required, whether a user interaction is required, a scope, a confidentiality impact, an integrity impact, and/or an availability impact.

11. The method of claim 1, wherein storing the values of the plurality of risk metrics in a vector to obtain the CVSS vector for the vulnerability comprises:

storing a string value for each of the plurality of risk metrics in the vector.

12. The method of claim 1, further comprising:

obtaining a training dataset comprising a plurality of CVSS vectors and a plurality of textual descriptions of vulnerabilities associated with the plurality of CVSS vectors;

obtaining, from the plurality of CVSS vectors, a set of values of each of the plurality of risk metrics thereby obtaining a plurality of sets of risk metric values corresponding to the plurality of risk metrics; and using each of the plurality of sets of risk metric values and the textual descriptions of the vulnerabilities to train a respective ML model to produce an output indicating a value of a risk metric corresponding to the set of risk metric values to obtain the plurality of trained ML models.

13. The method of claim 1, wherein generating the CVSS vector for the particular vulnerability comprises generating a CVSS 3.1 vector.

14. The method of claim 1, wherein generating the CVSS vector for the particular vulnerability comprises generating a CVSS 4 vector.

15. At least one non-transitory computer-readable storage medium storing instructions that, when executed by at least one computer hardware processor, cause the at least one computer hardware processor to perform a method for generating common vulnerability scoring system (CVSS) vectors for vulnerabilities to use by a vulnerability scanning system in scanning a computing environment for the vulnerabilities, each particular one of the CVSS vectors comprising values of a plurality of risk metrics that are used to determine a risk score for a vulnerability associated with the particular CVSS vector, the method comprising:

generating, using a plurality of trained machine learning (ML) models corresponding to the plurality of risk metrics, a CVSS vector for each particular vulnerability in a set of one or more vulnerabilities to obtain one or more CVSS vectors, the generating comprising:

obtaining a textual description of the particular vulnerability;

generating a CVSS vector for the particular vulnerability using the textual description of the particular vulnerability and the plurality of trained ML models corresponding to the plurality of risk metrics, each of the plurality of trained ML models having been trained to produce an output indicating a value of a respective one of the plurality of risk metrics for the particular vulnerability, the generating comprising:

generating inputs for each of the plurality of ML models using the textual description of the particular vulnerability, the generating comprising:

tokenizing the textual description of the vulnerability to obtain a plurality of tokens; and embedding the plurality of tokens using an embedding model to obtain a numerical representation of the textual description of the vulnerability; providing the inputs to the plurality of ML models to obtain outputs indicating values of the plurality of risk metrics for the particular vulnerability, the providing comprising providing the numerical representation as input to each of the plurality of ML models; and storing the values of the plurality of risk metrics indicated by the outputs of the plurality of ML models in a vector to obtain the CVSS vector for the particular vulnerability;

scanning, using the vulnerability scanning system, the computing environment for one or more vulnerabilities in the set of one or more vulnerabilities using the one or more CVSS vectors generated for the set of one or more vulnerabilities;

detecting at least one of the set of one or more vulnerabilities in the computing environment during the scanning; and in response to detecting the at least one vulnerability in the computing environment:

applying at least one patch in the computing environment to mitigate risk caused by the at least one vulnerability.

16. A system for generating common vulnerability scoring system (CVSS) vectors of vulnerabilities for use by a vulnerability scanning system in scanning a computing environment for the vulnerabilities, each particular one of the CVSS vectors comprising values of a plurality of risk metrics determined for a vulnerability associated with the particular CVSS vector, the system comprising:

at least one computer hardware processor; and at least one non-transitory computer-readable storage medium storing instructions that, when executed by the at least one computer hardware processor, causes the at least one computer hardware processor to perform:

generating, using a plurality of trained machine learning (ML) models corresponding to the plurality of risk metrics, a CVSS vector for each particular vulnerability in a set of one or more vulnerabilities to obtain one or more CVSS vectors, the generating comprising:

obtaining a textual description of the particular vulnerability;

generating a CVSS vector for the particular vulnerability using the textual description of the particular vulnerability and the plurality of trained ML models corresponding to the plurality of risk metrics, each of the plurality of trained ML models having been trained to produce an output indicating a value of a respective one of the plurality of risk metrics for the particular vulnerability, the generating comprising:

generating inputs for each of the plurality of ML models using the textual description of the particular vulnerability, the generating comprising:

tokenizing the textual description of the vulnerability to obtain a plurality of tokens; and embedding the plurality of tokens using an embedding model to obtain a numerical representation of the textual description of the vulnerability;

providing the inputs to the plurality of ML models to obtain outputs indicating values of the plurality of risk metrics for the particular vulnerability, the providing comprising providing the numerical representation as input to each of the plurality of ML models; and storing the values of the plurality of risk metrics indicated by the outputs of the plurality of ML models in a vector to obtain the CVSS vector for the particular vulnerability;

scanning, using the vulnerability scanning system, the computing environment for one or more vulnerabilities in the set of one or more vulnerabilities using the one or more CVSS vectors generated for the set of one or more vulnerabilities; and detecting at least one of the set of one or more vulnerabilities in the computing environment during the scanning; and in response to detecting the at least one vulnerability in the computing environment:

applying at least one patch in the computing environment to mitigate risk caused by the at least one vulnerability.

* * * * *